(12) United States Patent
Chen et al.

(10) Patent No.: US 6,464,354 B1
(45) Date of Patent: Oct. 15, 2002

(54) EYEGLASSES WITH IMPROVED LENS TILTING SUPPORT STRUCTURE

(75) Inventors: Wilson Chen; Lance Chen, both of Tainan (TW)

(73) Assignee: Crews, Inc., Memphis, TN (US)

( * ) Notice: Subject to any disclaimer, the term of this patent is extended or adjusted under 35 U.S.C. 154(b) by 0 days.

(21) Appl. No.: 09/863,370

(22) Filed: May 24, 2001

(51) Int. Cl.$^7$ .................................................. G02C 5/14
(52) U.S. Cl. ....................................... 351/120; 351/119
(58) Field of Search ................................ 351/120, 119, 351/121

(56) References Cited

U.S. PATENT DOCUMENTS 5,909,267 A * 6/1999 Hall et al. ................... 351/120
5,980,038 A * 11/1999 Chen .......................... 351/120

* cited by examiner

Primary Examiner—Huy Mai
(74) Attorney, Agent, or Firm—Ronald E. Greigg

(57) ABSTRACT

An improved eyeglasses construction including molded plastic temple assemblies each having a hinged joint intermediate its ends for limited pivotal movement permitting adjustment of the lens frame about the horizontal axis of the hinged joint. One piece of each temple assembly has a bifurcated end providing a pair of spaced flanges having parallel opposed vertical surfaces, and the other temple piece has a flat tongue-like member projecting from its end and including a generally C-shaped opening adapted to snap over the hinge pin to hingedly connect the two pieces in end-to-end relation. A spring arm on the bifurcated piece projects in overlying relation to a flat surface of the tongue-like member and carries a detent which is urged into engagement with a pattern of ridges and/or grooves on the surface of the tongue-like member to permit adjustment about the horizontal axis of the hinge pin.

20 Claims, 2 Drawing Sheets

EYEGLASSES WITH IMPROVED LENS TILTING SUPPORT STRUCTURE

BACKGROUND OF THE INVENTION

1. Field of the Invention

This invention relates to improvements in eyeglass structures and more particularly to protective eyeglasses including a lens support with adjustable temple members which are easily and reliably adjustable to permit the eyeglasses to be adapted to the individual wearer to afford maximum comfort and protection.

2. Description of the Prior Art

It is well known to provide eyeglasses with means for adjusting the inclination of the lenses, relative to the vertical, to accommodate the eyeglasses to the individual wearer's face. Such arrangements commonly include a lens frame or hinge members adjustably mounted to the temple members for limited relative movement about a horizontal axis, or temple pieces which are formed with an adjustable, articulated joint at a location rearwardly of the lenses. Earlier adjustable eyeglasses of this type were generally relatively complicated and frequently involved a number of separate parts which were difficult and/or expensive to produce and assemble. Examples of such eyeglasses can be found, for example, in U.S. Pat. Nos. 3,846,018 and 3,947,100 and in German Patent No. 1,286,779.

Other, and generally more recent eyeglass constructions of this general type have included frames molded entirely of plastic materials and generally have involved a smaller number of assembled parts, but these known structures have suffered from other deficiencies. For example, U.S. Pat. No. 4,527,291 discloses an arrangement in which the temple pieces are adjustably mounted on the lens frame without use of separate fasteners, but the adjustment of the lens frame was difficult to accomplish.

U.S. Pat. No. 4,017,165 discloses an eyeglass frame assembly in which the temple members are mounted to the lens frame by a universal hinge joint permitting relative movement about both a horizontal and a vertical axis, with pin members projecting through elongated serrated slots permitting the adjustment about the horizontal axis. In use, this arrangement can be relatively unstable so that unintended adjustment or relative movement can frequently occur.

U.S. Pat. No. 5,457,505 discloses a protective eyeglass construction in which the lens frame and temples are relatively adjustable about a horizontal axis by use of a two-piece temple hinge or joint with the two pieces being pivotally joined by a pin connection. An elongated tang or finger on one hinge piece has a pointed end acting as a detent which engages a serrated arcuate surface on the other piece to resiliently retain the hinge in its adjusted position. The arcuate serrated surface is formed on a thin, spring-like portion to permit deflection and reduce the tendency to strip the detent and/or serrations with use. Dimensioning the spring-like portion to provide the necessary resilience can result in looseness of the joint, while failure to provide the spring action can result in stripping of the detent and/or serrations.

U.S. Pat. No. 5,980,038 discloses a molded plastic adjustable temple assembly for eyeglasses including a two piece snap together hinge joint having a horizontally extending cylindrical hinge pin on one piece dimensioned to receive a C-shaped clamp on the other to provide for angular adjustment of the lens frame relative to the temples. An axially extending detent finger on one piece engages an arcuate serrated surface on the other to retain the temples and lens frame in a selected position for adjustment. U.S. Pat. No. 5,661,536 and Design Patent No. 370,930 disclose connecting arrangements for attaching temple members to an eyewear lens.

OBJECTS OF THE INVENTION

It is therefore an object of the present invention to provide a pair of eyeglasses with an improved means for adjusting the lenses about a generally horizontal axis relative to the temple pieces of a pair of eyeglasses.

Another object of the invention is to provide such a pair of eyeglasses in which the temple members each have a first piece pivotally mounted to the lens frame or to a lens for movement about a vertical axis and a second piece mounted to the first for limited pivotal movement about a horizontal axis to permit angular adjustment of the lenses on the temples, with an improved means for resiliently retaining the two pieces in their relatively adjusted position.

SUMMARY OF THE INVENTION

The foregoing and other objects and advantages of the invention are achieved in a pair of eyeglasses, typically safety glasses, having lenses mounted in a lens frame and a pair of temple assemblies mounted one on each end portion of the lens frame. Each temple assembly includes a first piece having a front end mounted to the lens frame for pivotal movement about a vertical axis to permit folding of the glasses for carrying or storage, and a second piece having a front end pivotally mounted to the rear end of the first piece to provide a hinged joint permitting limited relative movement about a horizontal axis. One of the temple pieces has an integrally formed horizontal hinge pin having a cylindrical outer surface extending around at least a major portion of its outer periphery, a major portion of its outer periphery and the other temple piece has an integrally formed, generally C-shaped, open ended clamp portion adapted to be snapped over and releasably engage the hinge pin to retain the two pieces assembled in end-to-end relation while permitting limited relative rotation about the horizontal axis of the hinge pin.

A generally flat surface of one of the temple pieces has a plurality of ridges and/or grooves (hereinafter, grooves) formed thereon at a location spaced from the hinge pin. The flat surface preferably is on the inner surface of the associated temple member, i.e. the surface closest the wearer's temple and preferably extends in a plane generally perpendicular to the axis of the hinge pin. An elongated springlike finger is integrally formed on the other temple piece and extends in the longitudinal direction of the temple assembly in overlaying relation to the grooves to releasably retain the two temple pieces in their adjusted position about the hinge axis. A flange is formed on the ends of the hinge pin to prevent axial movement of the C-shaped clamp thereon, and the resilient finger can be formed in a cut-out in one of the flanges. By forming the spring finger and grooves in the inner surfaces of the temple assemblies, they are invisible when the glasses are being worn.

By providing the detent on the ends of an elongated resilient finger which deflects to permit the detent to move over the grooves, stripping of the cooperating detent and grooves is substantially eliminated, thereby providing a longer lasting, more reliable adjusting means.

While the invention is generally described herein with reference to an embodiment in which the temple members are pivotally connected to the laterally extending end portions of a lens frame, it is to be understood that a lens frame, per se, is not required. Instead, the forward temple piece of the temple assemblies may be pivotally mounted one on each lateral end of a one-piece lense member, or one to each of two separate lense joined by a nose piece or the like, by use of a hinge member or other suitable connecting means. Accordingly, the terms "frame", or "lens frame", as used herein should be interpreted to include the structure for connecting and supporting the lens, or lenses, on the temple members.

BRIEF DESCRIPTION OF THE DRAWINGS

The foregoing and other objects and advantages of the invention will be apparent from the detailed description contained herein below, taken with the drawings, in which.

DESCRIPTION OF THE PREFERRED EMBODIMENTS

Figure 1:
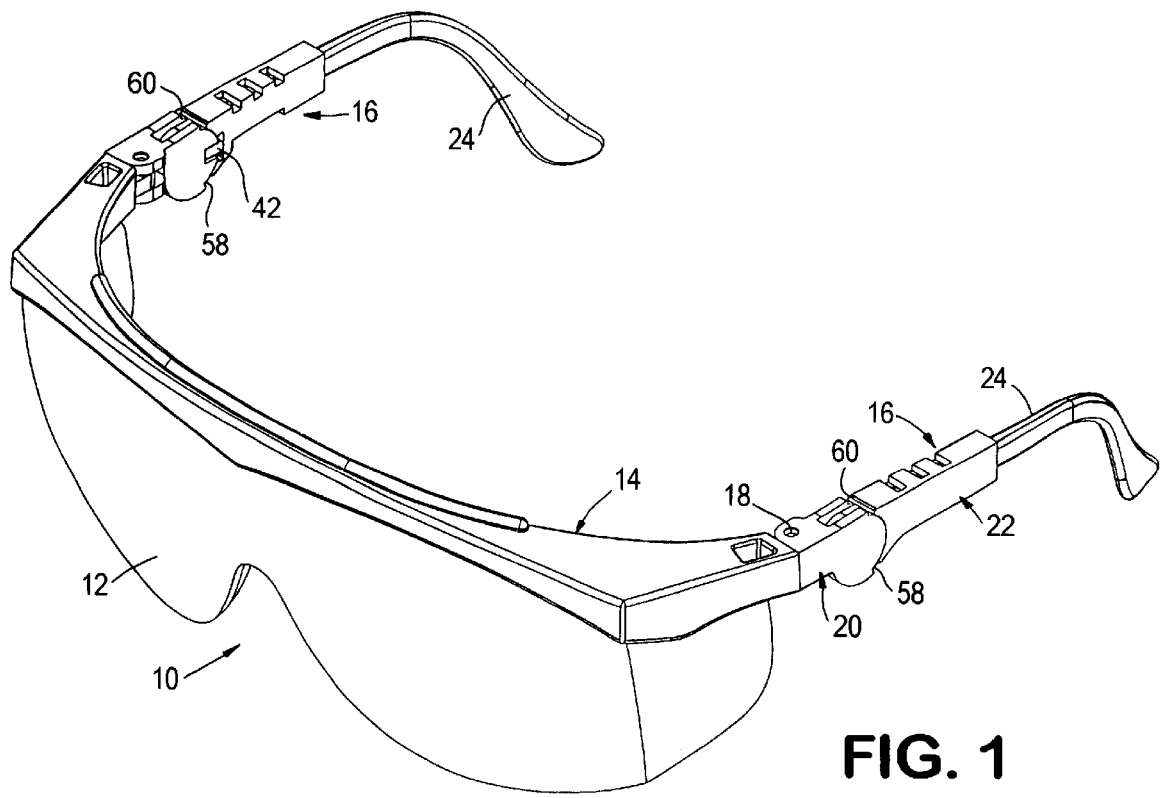
FIG. 1 is an isometric view of a pair of safety glasses embodying the invention.
Figure 2:
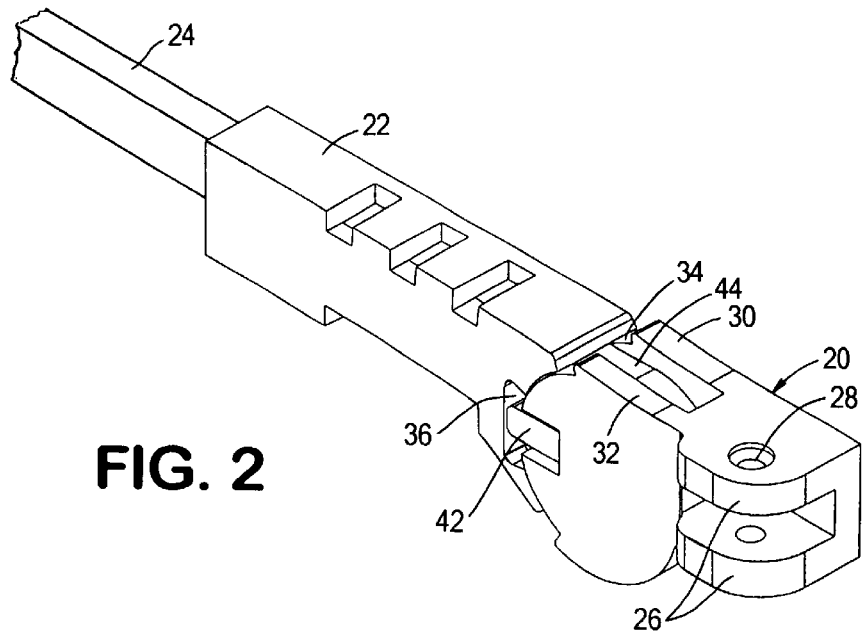
FIG. 2 is an enlarged exploded isometric view of a temple assembly of the eyeglasses shown in FIG. 1.

Referring now to the drawings in detail, a pair of protective eyeglasses, or safety glasses, embodying the invention is designated generally at 10 in FIG. 1 and includes a pair of lenses 12 mounted on a bow or lens frame 14 and a pair of temple assemblies 16. The lenses may be separate pieces or integrally formed as a single element as is known in the art.

The temple assemblies 16 are mounted one on each end portion of the lens frame 14 for pivotal movement about a generally vertical axis by a conventional hinge joint including a pin 18 to permit the temples to be folded for carrying or storage of the eyeglasses in the conventional manner. The temple assemblies 16 are mirror images of each other and each includes a first temple member 20 having a first end hingedly mounted on the lens frame 14 by the hinge pin 18, the second temple member 22 hingedly mounted to a second end of the first temple member for limited pivotal movement about a horizontal axis to permit adjustment of the angle of the lens frame 14 and lenses 12 relative to the temples 16 to adapt the eyeglasses to fit the individual wearer. The second temple member 22 may have an integrally formed earpiece or may support an adjustable, telescoping earpiece 24 as is known in the art.

The temple member 20 has a pair of spaced tabs or ears 26 having an opening 28 extending therethrough for receiving the hinge pin 18 to mount the temple to lens frame 14. This construction is conventional and forms no part of the invention. On the end opposite the opening 18, temple piece 20 is bifurcated to provide a pair of parallel, laterally spaced flanges 30, 32 which preferably have generally arcuate rearwardly facing surfaces 34, 36 respectively. An integrally molded cylindrical hinge pin 38 extends between flanges 30, 32 as is most clearly seen in FIGS. 4, 6 and 7. Flange 32 has a generally rectangular, rearwardly facing recess 40 formed in its arcuate surface 36 and an axially extending spring lever retaining member 42 is formed in the recess and projects rearward from the surface 36 as more fully described hereinbelow.

Temple member 22 has a forwardly directed mounting tongue 44 dimensioned to be received snugly between the opposing vertical surfaces of flanges 30, 32. Tongue 44 has a generally C-shaped configuration, including a cylindrical opening 46 extending therethrough with the diameter of opening 46 being substantially equal to the diameter of hinge pin 38. A generally V-shaped notch is provided in the forward end of the tongue 44 with the notch extending into the cylindrical opening 46 to provide camming surfaces 48, 50 positioned to engage the surface of hinge pin 38 and spread the opposed arms 52, 54 of tongue 44 to enable the hinge pin 38 to be snapped into the opening 46 to releasably assemble members 20 and 22 while permitting limited relative rotation between the assembled members about the horizontal axis of pin 38. The diameter of the opening 46 may be such as to apply a slight clamping force to the hinge pin which, together with the flanges 30, 32 which engage the opposed side surface of tongue 44, provide a very stable joint.

A pair of abutment shoulders 56 are formed on the top surface of flanges 30, 32 and a similar pair of shoulders 58 are formed on the lower surface of the flanges. Shoulders 56, 58 are positioned to engage opposing stop surfaces 60, 62 on the top and bottom end portion of member 22 adjacent the rear end of tongue 44 to positively limit the relative pivotal movement of members 20, 22 about the horizontal axis of pin 38.

The tongue 44 has parallel side faces, or surfaces, which are received in closely spaced relation between the opposed parallel inner surfaces of flanges 30, 32 and preferably member 22 has a forwardly directed generally concave arcuate surface 64 which generally conforms to the arcuate surfaces 34, 36 when the parts are assembled. This hinge structure provides a high strength joint which may nevertheless be readily assembled and disassembled without the use of tools or fasteners.

Figure 3:
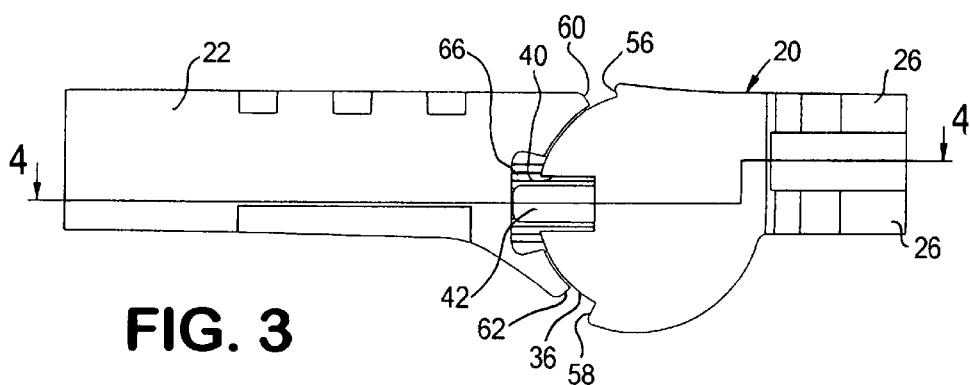
FIG. 3 is a side elevation of a portion of a temple assembly of the eyeglasses shown in FIG. 1.
Figure 5:
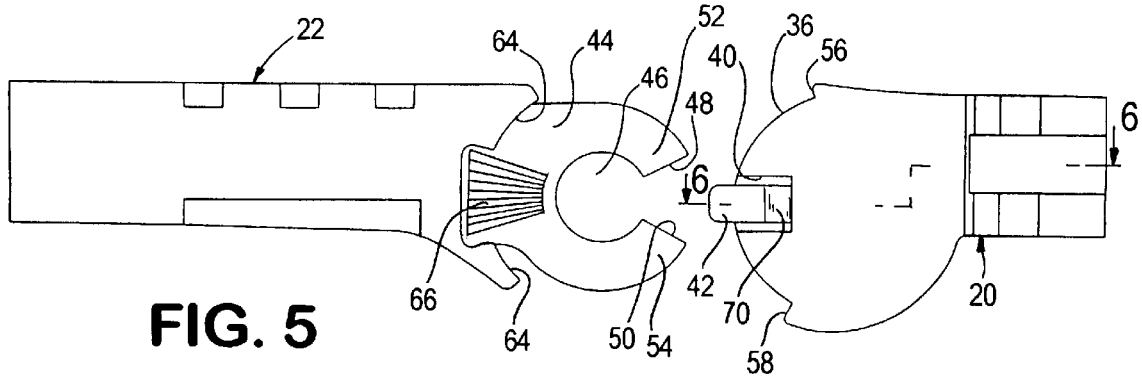
FIG. 5 is an exploded side elevation view of a portion of an alternate embodiment of the temple assembly.

To retain the assembled temple members in the desired adjusted position, the inwardly directed flat vertical face or surface of the tongue 44 has a plurality of grooves 66 formed therein at a location extending rearwardly from the cylindrical opening. The ridges and/or grooves 66 may extend generally parallel to one another and generally parallel to the axis of the temple assemblies 16 as best seen in FIG. 3 or may extend in a generally radial or fan-shaped pattern having its radial center at the radial center of the opening 46 and hinge pin 38, when assembled, as seen in FIG. 5. Also, the pattern may be recessed into the surrounding plane surface or project outwardly therefrom. The grooves 66 are engaged by one or more detents or teeth 68 formed on the inwardly directed surface of the rearwardly projecting end portion of the spring lever 42 to releasably retain the members in the desired position of adjustment around the axis of hinge pin 38.

Figure 4:
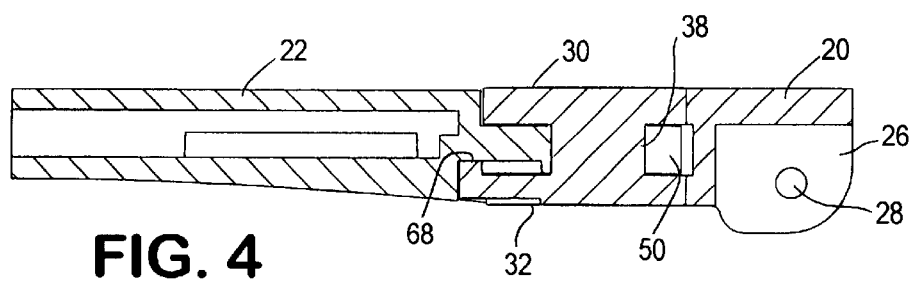
FIG. 4 is a sectional view taken along line 4—4 of FIG. 3.
Figure 6:
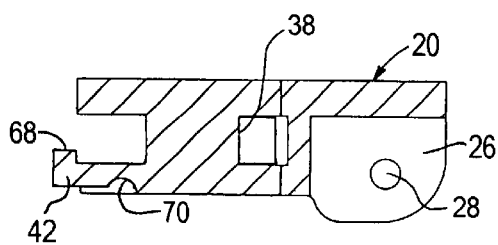
FIG. 6 is a sectional view taken along line 6—6 of FIG. 5.
Figure 7:
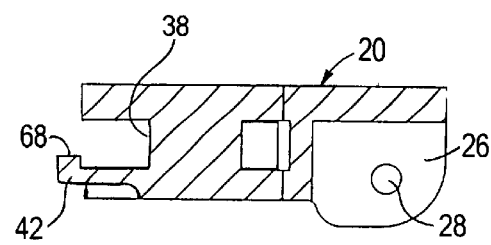
FIG. 7 is a view similar to FIG. 6 showing a further modification.

As best seen in FIG. 4, the spring lever 42 has a transverse thickness, measured in the direction parallel to the axis of hinge pin 38, that is less than the thickness of the flange 32. Further, as seen in FIGS. 5 and 6, a cutout or relief 70 may be formed in the inner surface of the lever, adjacent to its forward end, to provide increased flexibility to permit the lever to deflect slightly as the detents 68 move over the grooves 66 upon relative movement of the temple members 20, 22 about hinge pin 38. The resilience of the thermoplastic material is sufficient to provide a spring action retaining the detent 68 in firm contact with grooves 66. FIG. 7 shows a further configuration of the spring lever 42.

By molding the temple members from a relatively low friction thermoplastic material, the diameter of the cylindrical opening 46 can be made slightly smaller than that of the pin 38 to thereby provide a light clamping force when the two parts are assembled, with the result that a relatively high strength stable joint is produced to resist flexibility in the horizontal direction. Also, by providing the contact area between the grooves 66 and detents 68 at a location spaced axially from the arcuate surfaces of the flanges 30, 32, a positive engagement providing a greater mechanical advantage may be achieved without stripping the grooves and/or detents, thereby increasing the useful life of the adjustability feature of the joint. In this regard, a second set of grooves 66 may be formed on the opposite surface of the tongue 44, and a second retaining finger 42 provided in association with the second flange 30 thereby providing redundant adjusting means to more positively retain the joint in the desired adjusted position. The grooves preferably are formed on a flat surface of the tongue 44 but may be formed on a flat surface extending at an acute angle thereto. In this configuration, the angle of the flat surface relative to the surface of tongue 44 should be slight, and preferably no more than about 100. In this configuration, the detents 68 may be slightly shorter to facilitate snapping the temple members 20, 22 together.

While a preferred embodiment of the invention has been disclosed and described, it should be understood that the invention is not so limited and it is intended to include all embodiments and modifications which would be apparent to one skilled in the art and which come within the spirit and scope of the invention.

We claim:

1. Protective eyeglasses comprising lens means having laterally opposed ends, a pair of elongated molded plastic temple assemblies, and mounting means mounting said temple assemblies one on each said laterally opposed ends for pivotal movement about a vertical axis, each said temple assembly including first and second temple members each having opposed ends and hinge means connecting said temple members in end-to-end relation for limited relative movement about a horizontal axis, said hinge means including a bifurcated end on one temple member providing a pair of laterally spaced flanges having opposed, parallel generally vertical surfaces and an integrally molded cylindrical hinge pin extending between and perpendicular to said parallel surfaces, and a generally flat tongue molded with and projecting from the other said temple member, said tongue having opposed flat faces dimensioned to be received in close fitting relation between said parallel flange surfaces, a pair of opposing arms on said tongue defining a generally C-shaped clamp opening extending into the tongue in position to snap over and receive said hinge pin, said C-shaped opening having a surface defined by an arc of a circle extending for more than 180° therearound with the arcuate surface having a radius substantially equal to the radius of said cylindrical hinge pin, and angular adjusting means including a plurality of grooves formed on a flat surface adjacent and substantially parallel to at least one of said flat faces of said tongue at a location spaced from said arcuate surface, a resilient spring arm integrally molded at least with one of said flanges and extending generally perpendicular to the axis of said hinge pin, each said spring arm including a surface overlaying said grooves on one of said flat surfaces, and detent means integrally molded on each said spring arm in position to engage said grooves when said temple members are snapped together, said spring arm resiliently urging said detent means into contact with said grooves to effectively retain said temple members in a selected position of relative rotation about said hinge pin to thereby permit the lens means to be adjusted about said horizontal axis.

2. The eyeglasses defined in claim 1, wherein said bifurcated end is formed on said first temple member and said first temple member has its other end pivotally connected to said mounting means.

3. The eyeglasses defined in claim 2, further comprising shoulder means on one of said temple members and stop means on the other temple member for engaging said shoulder means to limit relative pivotal movement of said temple members about said horizontal axis.

4. The eyeglasses defined in claim 3, wherein each said at least one spring arm has a thickness, measured parallel to the axis of said hinge pin, which is less than the thickness of the associated flange.

5. The eyeglasses defined in claim 4, wherein said detent means on each said at least one spring arm contacts said grooves at a location spaced from the associated flange.

6. The eyeglasses defined in claim 5, further comprising a recess formed in said temple member, said spring arm having a first end extending outwardly from its associated flange and into said recess.

7. The eyeglasses defined in claim 1, wherein said grooves extend in a longitudinal pattern generally parallel to one another and generally perpendicular to a vertical plane containing the axis of said hinge pin when the temple members are assembled.

8. The eyeglasses defined in claim 1, wherein said grooves extend in a generally radial pattern having its radial center at the axis of said hinge pin when the temple members are assembled.

9. The eyeglasses defined in claim 1, wherein said C-shaped clamp is dimensioned to apply a light clamping force to said hinge pin when the temple members are assembled.

10. The eyeglasses defined in claim 1, wherein each said flat surface is a flat face of said tongue.

11. The eyeglasses defined in claim 1, wherein each said flat surface extends at an acute angle of no more than about 100 relative to one flat face of said tongue.

12. The eyeglasses defined in claim 1, wherein said spring arm has a thickness measured in the direction of the axis of said hinge pin which is less than the thickness of said flanges.

13. The eyeglasses defined in claim 1, further comprising a cutout in each said spring arm to increase its flexibility.

14. The eyeglasses defined in claim 1, wherein said mounting means comprises a lens frame having said laterally opposed ends each pivotally supporting one of said temple assemblies for movement about a vertical axis.

15. The eyeglasses defined in claim 1, wherein said angular adjusting means comprises a plurality of grooves formed on a flat surface adjacent and substantially parallel to each of said flat faces, a resilient spring arm integrally molded with each of said flanges and extending generally perpendicular to the axis of said hinge pin, each said spring arm including a surface overlaying said grooves on one of said flat surfaces, and detent means integrally molded on each said spring arm engaging said grooves when said temple members are snapped together, thereby providing redundant angular adjusting means.

16. In a temple assembly for eyeglasses having first and second temple members molded from a synthetic resin material and hinge means connecting the temple members in end-to-end relation for limited pivotal movement relative to one another about a generally horizontal axis, the hinge means including a bifurcated end on one of the temple members defining a pair of spaced flange members having parallel spaced, generally vertical surfaces and an integrally molded generally cylindrical hinge pin extending between and perpendicular to the vertical surfaces, a generally flat tongue projecting from the end of the other temple member having opposed flat surfaces dimensioned to be received in closely fitting relation between the parallel flange surfaces, a generally C-shaped opening on the end of the tongue adapted to snap over and be releasably retained on the hinge pin for limited rotation about the hinge pin axis, and angular adjusting means for releasably retaining the temple members against rotation, said adjusting means comprising a plurality of grooves formed in one of said flat surfaces at a location spaced from said C-shaped opening, an elongated spring arm integrally molded with and projecting from one of the flanges in overlying relation to said grooves, and detent means on said spring arm, said spring arm resiliently urging said detent means into engagement with said grooves to releasably retain the two temple members in a selected position of adjustment about the horizontal axis of said hinge pin.

17. The eyeglasses defined in claim 16, further comprising rotation limiting stop means on said first and second temple members for limiting relative rotation about said horizontal axis.

18. The eyeglasses defined in claim 17, wherein said grooves extend in a longitudinal pattern generally parallel to one another and generally perpendicular to a vertical plane containing the axis of said hinge pin when the temple members are assembled.

19. The eyeglasses defined in claim 17, wherein said grooves extend in a generally radial pattern having its radial center at the axis of said hinge pin when the temple members are assembled.

20. The eyeglasses defined in claim 17, wherein said C-shaped opening is dimensioned to apply a light clamping force to said hinge pin when the temple members are assembled.

* * * * *